United States Patent [19]

Priebe

[11] 4,036,664
[45] July 19, 1977

[54] PROCESS FOR CONCENTRATING DILUTE AQUEOUS STARCH MIXTURES

[75] Inventor: William F. Priebe, Irving, Tex.

[73] Assignee: Frito-Lay, Inc., Dallas, Tex.

[21] Appl. No.: 573,978

[22] Filed: May 2, 1975

[51] Int. Cl.² .............................................. C13L 1/00
[52] U.S. Cl. ...................................... 127/69; 127/66; 127/67; 209/18; 209/173; 209/211; 210/521
[58] Field of Search .............. 127/66, 67, 69; 209/18, 209/173, 211; 210/521

[56] References Cited

U.S. PATENT DOCUMENTS

| | | | |
|---|---|---|---|
| 2,149,802 | 3/1939 | Thurber | 127/66 |
| 2,418,669 | 4/1947 | Schilling | 127/67 |
| 2,798,011 | 7/1957 | Fontein | 127/66 |
| 2,974,068 | 3/1961 | Fontein | 127/67 |
| 3,736,182 | 5/1973 | Wright | 127/67 X |
| 3,890,888 | 6/1975 | Verberne | 127/66 X |

Primary Examiner—Joseph Scovronek
Assistant Examiner—Sidney Marantz
Attorney, Agent, or Firm—Bernard & Brown

[57] ABSTRACT

Process for concentrating starch contained in very dilute, aqueous mixtures having, for example, a starch content of less than about 1 weight percent. The concentrated product is obtained as an aqueous mixture containing starch solids in the amount of at least about 30 weight percent, preferably about 35 to 50 weight percent. The concentrating operation involves the sequential use of a gravity settling technique, especially lamellar plate settling, to increase the starch content of the solid-liquid mixture to about 5 to 20 weight percent. This mixture can be readily removed from the settler, and further concentrated centrifugally, e.g., in a liquid cyclone, by a factor of at least about 2 to provide the desired aqueous mixture having a concentration of at least about 30 weight percent of starch solids. The latter stream can be readily and effectively handled and treated to recover relatively pure, essentially solid, food grade starch of low moisture content, e.g., less than about 10 weight percent.

15 Claims, 1 Drawing Figure

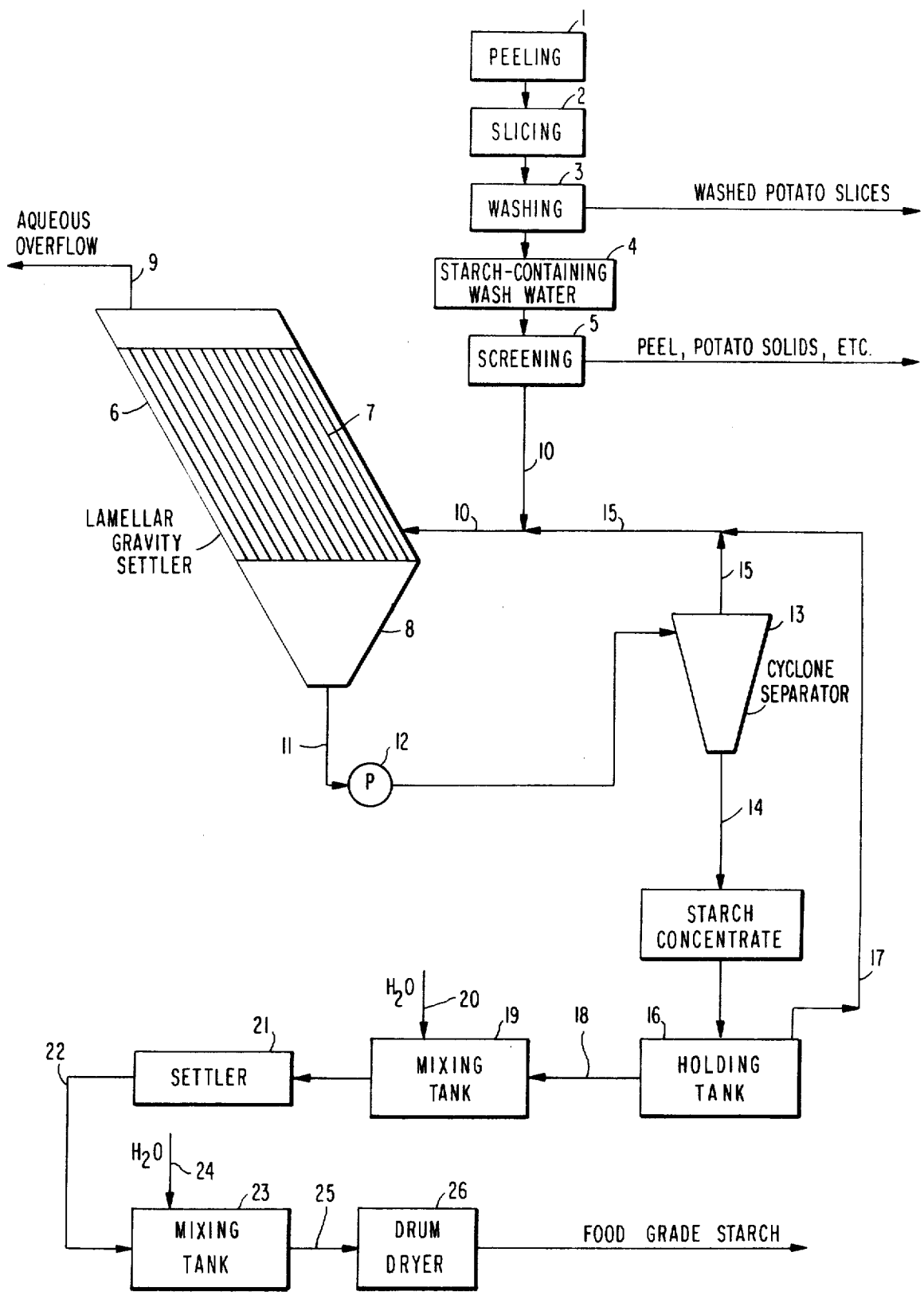

PROCESS FOR CONCENTRATING DILUTE AQUEOUS STARCH MIXTURES

This invention relates to a process for concentrating very dilute, aqueous starch mixtures to obtain an aqueous product having a sufficient content of starch solids so that it can be readily and economically handled and treated to obtain substantially pure, essentially solid, food grade starch of low moisture content.

In many commercial plants that process raw crops, there may be obtained aqueous process streams which contain very small amounts of starch derived from the foodstuffs being treated. For example, in the manufacture of potato solids, e.g., potato chips, the initial processing steps frequently involve operations such as peeling and washing which are done in the presence of water or other aqueous media. Peeling or subdividing exposes the inside of the potato or other starch-containing crop to make starch available for removal by fluid contact as would occur during operations such as cleaning, washing or other treatment with an aqueous medium. The starch is essentially raw or ungelatinized, and the aqueous medium separated from the crops may often contain less than about 1 weight percent of starch solids. In many of such operations over the years, these very dilute, starch-containing streams have been disposed of as waste from industrial plants. Although these streams have sometimes been discharged directly into a natural body of water to cause pollution, more often to reduce this pollution problem the dilute, aqueous starch mixtures have been processed in sewage treatment plants which gives rise to considerable expense. In order to reduce such costs and pollution problems, efforts have been made to find ways of recovering the starch from these dilute, aqueous streams in an economically-feasible manner, and it is particularly desired that the recovered starch be of sufficiently high quality to be useful in the same manner as food grade starch obtained from primary sources.

Industrially produced starch-water mixtures having less than about 1 weight percent starch generally contain the solids in relatively dispersed form and separation of the essentially water-insoluble starch proceeds slowly when the mixture is maintained quiescent. This slow rate of starch separation coupled with the presence of bacterial nutrients in such streams makes the separation of the starch solids by simple settling unattractive, since bacterial growth and starch degradation usually occur during the time required for the separation. Ths use of bacterial growth inhibitors is ineffective, expensive or undesirable due to their contaminating effect on the starch product. When, however, the concentration of starch in the aqueous mixture is increased to at least about 30 weight percent, the starch separates fairly readily even when standing quiescently in a container, and such mixtures can be easily and economically processed to prepare relatively pure, essentially solid, food grade starch by reslurrying, water washing and drying techniques. A main difficulty encountered in this overall recovery operation is in devising a satisfactory way of concentrating the aqueous, starch-containing mixture from a level of less than about 1 weight percent starch solids to obtain a starch solids-aqueous mixture which has at least about 30 weight percent, say about 30 to 60 weight percent, of starch. The present invention is a process which accomplishes this desired concentration of starch in a commercially-acceptable and economically-attractive manner.

Centrifugal separators such as liquid cyclones have been employed to concentrate starch in aqueous mixtures and there has appeared an article in *Food Engineering*, pp. 66 and 67, October, 1974, which describes a method of using liquid cyclones to concentrate the starch in aqueous streams obtained from potato chip manufacturing operations and having a 3 percent starch content. In this procedure the water discharged into the sewer still contained about 0.5 weight percent starch. It is a purpose of the present invention to concentrate the starch in very dilute, aqueous mixtures containing less than about 1 weight percent starch and, thus, having a starch concentration of the order of or somewhat less than the material discarded as waste as described in the foregoing cited article. An attempt to treat such dilute, aqueous mixtures by the use of liquid cyclones to obtain a stream of greater than about 30 weight percent starch solids was relatively unsuccessful. In a study involving the use of liquid cyclones in a vacuum dryer, it was found that this combination of treating operations was ineffective to obtain an aqueous starch mixture having sufficient concentration suitable for further processing. Subsequently, plural stages of liquid cyclones were tried and although the desired concentration of starch could be obtained, the system was relatively complicated since several pumps and regulator valves were needed, and during operation mechanical and operational problems were encountered. Operational breakdowns occurred frequently and these, along with the complicated nature of the system, gave rise to a need for close personal attention which resulted in high operating costs.

Further attempts to solve this starch recovery problem led to the use of a gravity settling clarifier which required little operator attention for satisfactory mechanical performance, and recoveries of up to about 90% of the starch were experienced. Due to the extended residence time of the aqueous starch mixture in the settling zone, substantial bacterial growth was encountered, which, however, could be alleviated by the use of pH control and frequent cleaning of the equipment. A more difficult problem arose in that the underflow or concentrated aqueous starch mixture which separated in the clarifier could not be discharged effectively since it was so solid that it could not be efficiently moved from the bottom of the clarifier to a pump used for transporting the concentrated stream from the clarifier. Indeed, plugging in the passageway to the pump occurred frequently and resulted in pump failure. After these considerable and relatively ineffective efforts to concentrate very dilute, starch-containing, aqueous mixtures, the process of the present invention was devised and found to provide a very satisfactory solution to the problem.

By employing the method of the present invention, it has been found that starch present in industrially produced, aqueous mixtures in concentrations of less than about 1 weight percent can be readily and economically concentrated to provide a mixture from which essentially solid, relatively pure, food grade starch can be easily prepared. In the process which requires little maintenance and operator control, the very dilute, aqueous starch mixture is subjected to gravity settling in order to prepare an intermediate concentrate having about 5 to 20 weight percent of starch solids. This intermediate concentrate can be readily handled, pumped or otherwise transported from the gravity settling operation, and is then subjected to further concentration by the use of a centrifugal separator to provide an aqueous starch mixture containing at least about 30 weight percent of starch solids. The latter concentrate has a sufficient water content so that it can be readily transported and processed by means such as settling, reslurrying in water, resettling and drying to prepare an essentially solid, relatively pure, ungelatinized or gelatinized starch of high quality suitable for use as a replacement in foodstuffs which normally use primary starch sources. The separation of the starch from the concentrate is easily accomplished and is highly efficient in terms of starch recovery. Due to the nature of the separating operations and the concentrations of starch and bacterial nutrients, or the availability of the latter, in the materials undergoing treatment, the process of the invention can be accomplished without undue bacterial growth and starch degradation. Also, by employing sequentially the gravity settling and centrifugal separating techniques, the less concentrated aqueous medium obtained has a very low starch content. This material is generally sufficiently low in starch contenet that it can be reused as, for example, wash water in the various crop-treating operations from which may be derived the initial, very dilute starch-containing aqueous mixtures processed in accordance with the present invention. The efficiency of starch recovery in the gravity settling and centrifugal separating operations may be greater than about 75 or 80 weight percent, or even greater than about 90 weight percent, based on the highly dilute, aqueous starch mixture used as the feedstock to the gravity settling operation.

The present invention will be further described in connection with the accompanying flow sheet drawing, which illustrates diagramatically a typical operation in which the invention has been used to concentrate raw or ungelatinized starch in an aqueous mixture produced during peeling and slice washing operations in the manufacture of potato chips. Although the process is preferably employed to concentrate potato starch mixtures, it may also be used on other industrially-derived, dilute, aqueous starch mixtures containing starch in an amount of less than about 1 weight percent, and in which the starch is sufficiently finely divided to be dispersed in the water phase. These aqueous starch mixtures can be derived from other than potato sources, for instance from the processing of corn or other cereal grains, tapioca root and the like.

In processing raw white potatoes into chips, the very dilute, aqueous starch-containing mixtures which are useful as the initial feed material to the process of the present invention may be obtained as wash water from sequential operations such as peeling 1, slicing 2 and water washing 3 as shown in the drawing. The wash water 4 frequently contains pieces of peel or potatoes or other solids, e.g., undispersed starch, of relatively large particle size. The resulting washed potato slices can be processed into fried chips in any desired manner. The starch which is dispered throughout the very dilute, aqueous mixture, e.g., wash water, is finely divided and may often have particle sizes of less than about 100 microns, or even less than about 50 microns. The larger particle size materials can be separated from the aqueous starch dispersion by the latter being passed through a separator screen 5 of small mesh size, for example, greater than about 20 mesh, and in a typical operation this screen may be 40 mesh.

In accordance with the present invention, the aqueous starch dispersion which passes through the screen can be subjected to gravity settling which is controlled to provide a more concentrated starch-containing mixture having about 5 to 20 weight percent solids and sufficient water to make the mixture readily flowable through pipes, pumps or other equipment. The gravity settling operation generally accomplishes at least about 75 to 80 weight percent or even at least about 90 weight percent recovery of the starch in the more concentrated, starch-containing fraction obtained. The fraction of the initial feedstock which separates as an aqueous medium having a lesser concentration of starch solids than the feedstock, has a very low starch content which is usually less than about 500 parts per million, preferably less than about 300 or 250 parts per million. This liquid fraction may be reused as wash water in the potato peeling or slice washing operations.

The gravity settling operation of this invention may be accomplished in equipment of various suitable types, especially equipment which can accomplish hindered, gravity settling in relatively low or short starch residence times, and a preferred hindered, gravity settler has a lamellar construction. In one embodiment of this liquid-solid separation, the feedstream passes through line 10, enters the lower portion of the settler 6 and flows in laminar fashion upward between slanted surfaces 7 on which the separated solids deposit and then move downwardly on the solid surfaces into the lower portion 8 of the separating vessel to provide a mixture which is more concentrated in the solid components of the feed. At the same time, the less concentrated liquid stream progresses upwardly between the slanted surfaces and exits the upper end to provide a overflow liquid stream 9 or relatively low solids content. In a particularly preferred form of this device used in the present invention, the surfaces are arranged as essentially flat, parallel, solid metal plates, preferably positioned on an acute angle to the vertical, at their bottom. The flow of liquid may be upwardly or downwardly in such devices, and the solids separate onto the plates and move downwardly to a lower collecting zone. The residence time of the starch undergoing separation in such equipment in accordance with this invention is often less than about 30 or 40 minutes, preferably less than about 10 or 15 minutes. This type of equipment is available commercially from the Parkson Company of Ft. Lauderdale, Florida. The plate-type of gravity settler is more advantageous when used in the present invention than, for example, a tube-type, gravity settler. Typical plate-type gravity settlers are described in U.S. Pat. Nos. 3,794,167; 3,494,475 and 3,552,554.

As an example of an operation in accordance with the present invention, the starch-containing aqueous dispersion passing through the foregoing described screen 5 may have a starch content of 0.2 to 0.3 percent and is charged via line 10 at the rate of about 128 gallons per minute to the plate-type, lamellar settler 6. The settler has a total effective settling area of 1000 square feet which is the sum of the horizontally projected areas of all the stainless steel plates 7 in the settler. The overflow of aqueous medium from the settler is about 127.6 gallons per minute, and this aqueous medium contains about 200 parts per million of starch solids. A phosphoric acid or other acidic pH adjustor which will not unacceptably contaminate the starch may be passed into the settler 6 in an amount sufficient to combat bacterial growth, e.g., to maintain a pH of about 3 to 4. The aqueous fraction which is more concentrated in starch than the feedstock to the gravity settler can be removed from the lower, clarifying section of the settler through line 11 by a pump 12, suitable for pumping heavy or viscous liquids, for instance, of the Moyno, or other positive displacement type, which may have a variable speed control to adapt its use to operations involving starch-containing media derived from different sources. Typically, this pumping may be at the rate of approximately 4 gallons per minute and this material may contain, for example, about 10 weight percent starch. This material serves as the charge to the centrifugal separator 13 used in the process of the present invention.

The centrifugal separator 13 employed in the process of this invention is a liquids-solids classification device which utilizes centrifugal force as a means of concentrating the starch component of the feedstream. Preferred separators of this type are referred to as liquid cyclone separators, and they need have no moving parts. One type of liquid cyclone separator is commercially-available from, for instance, Dorr-Oliver Incorporated, Stamford, Conn., as a compact, cylindro-conical classification unit having a tangential feed inlet on its upper end. The liquids-solids mixture forms a vortex in the device with the more concentrated solids exiting from the lower end. The overflow is the stream that is less concentrated in starch solids.

In the present invention, the concentrated underflow from the gravity settler is charged to the centrifugal separator, and the latter separates as an underflow, an aqueous, starch-containing stream 14 which is more concentrated in starch solids, and which can be readily handled for further processing. Thus, in the liquid cyclone 13, the concentration of the starch solids may be increased from approximately 5 to 20 weight percent present in the chargestock to an aqueous mixture containing about 30 to 60, preferably about 35 to 50, weight percent starch solids, and the extent of concentration in this operation is by a factor of at least about 2, preferably at least about 3. Advantageously, the more concentrated stream 14 taken from the liquid cyclone preferably contains at least about 30% more starch solids than the feed charged to this operation. If it is attempted to effect too great a solids concentration by this operation, there may be undue loss of starch fines in the overflow which may not be recovered even if the stream is returned to the gravity settler.

In the typical operation described herein, a 10% starch-containing, aqueous medium is charged to the liquid cyclone separator 13 at the rate of about 4 gallons per minute. The streams issuing from the cyclone include an overflow 15 at the rate of about 3.6 gallons per minute containing about 4 weight percent starch, and this material can be returned by line 10 to the lower portion of the gravity settler to undergo further separation. The underflow 14 from the liquid cyclone is at the rate of about 0.4 gallons per minute, and it contains about 50 weight percent ungelatinized starch. The latter aqueous mixture may thus be separated by the method of the invention by conducting this gravity settling and centrifugal separating operation without the use of temperatures sufficiently elevated to cause substantial gelatinization of the starch. The material undergoing separation by this procedure may thus be at ambient or room temperatures below about 35° C. and be suitable in this and other respects. The underflow from the liquid cyclone can be readily processed to obtain relatively pure, essentially solid, food grade starch at a high recovery rate.

An operation which can be used to process the more concentrated, starch-containing mixture or underflow from the centrifugal separator into relatively pure starch generally includes several operations. For example, the mixture from the liquid cyclone separator may stand quiescently in a holding tank 16 which is lined with a plastic such as polypropylene or polyethylene, and the starch is relatively, chemicaly stable. After being held for a convenient settling time in this vessel, for instance, at least about 1.5 hours, the aqueous upper layer which is formed may be decanted or otherwise separated from a settled, solids phase without undue loss of starch. The decanted liquid may be charged by lines 17, 15 and 10 to the lower portion of the gravity settler 6 for recovery of the contained starch. The resulting starch-containing solids phase represented by line 18 can be reslurried in mixing tank 19 in water added via line 20 and resettled in settler 21, and this washing operation may be repeated to obtain a purer, starch-containing material. The resulting solids represented by line 22 are mixed in tank 23 with sufficient water added via line 24 to provide a material of pumpable consistency, for instance, containing about 40 to 50 weight percent water. The latter material may be passed by line 25 to a dryer 26 to obtain solids of less than about 10 or 15 percent moisture. Typically, in drum-drying operations, the steam employed as the heat source may have a temperature of about 155° to 160° C. and at such temperature the solids may be at temperatures of about 100° to 110° C. The severity of drying can be controlled to give a product of desired moisture content, and this is preferably less than about 10 weight percent to avoid undue stickiness in the starch and difficulties during subsequent handling and treating. It is preferred to use drying conditions which will gelatinize ungelatinized starch during the drying operation. The solids separated from the dryer may be milled to, for example, less than about 20 mesh size, with about 80% passing a 100 mesh screen. This starch is greater than 99% pure and can be used as a direct replacement for primary starch in various food formulations.

I claim:

1. A process for the concentration of finely-divided starch in an aqueous mixture having less than about 1 weight percent starch which comprises separating said aqueous mixture in a gravity settling zone into fractions of lesser and greater contents of starch solids, said fraction of greater starch content containing about 5 to 20 weight percent of starch solids and being of flowable and pumpable consistency, passing said fraction of about 5 to 20 weight percent of starch solids to a centrifugal separation zone, wherein fractions of greater and lesser starch solids content are separated, said fraction of greater starch content containing about 30 to 60 weight percent of starch solids and at least about 2 times the percent of starch solids in said fraction passed to said centrifugal separation zone.

2. The process of claim 1 in which said fraction of lesser starch content separated from said centrifugal separation zone, is returned to the gravity settling zone.

3. The process of claim 1 in which said fraction of lesser starch content separated in said gravity settling zone has a starch content of less than about 500 ppm.

4. The process of claim 1 in which substantially pure, essentially solid starch is recovered from said fraction of greater starch content separated from said centrifugal separation zone.

5. The process of claim 1 in which the separation in said gravity settling zone is accomplished between slanted plates disposed on an angle within said zone and in which the more concentrated starch-containing fraction moves downwardly on said plates.

6. The process of claim 5 in which said gravity settling zone is at a pH of about 3 to 4.

7. The process of claim 5 is which said centrifugal separation zone is a liquid cyclone separation zone and said fraction of lesser starch content separated from said liquid cyclone separation zone, is returned to the gravity settling zone.

8. The process of claim 7 in which substantially pure, essentially solid starch is recovered from said fraction of greater starch content separated from said liquid cyclone separation zone.

9. A process for the concentration of finely-divided, ungelatinized starch in an aqueous feed mixture having less than about 1 weight percent starch which comprises separating said aqueous mixture in a laminar flow, gravity settling zone into fractions of lesser and greater contents of starch solids, said fraction of lesser starch content containing less than about 300 ppm of starch and said fraction of greater starch content containing about 5 to 20 weight percent of starch solids and at least about 90 weight percent of the starch in said aqueous feed mixture, and being of flowable and pumpable consistency, passing said fraction of about 5 to 20 weight percent of starch solids to a liquid cyclone separation zone, wherein fractions of greater and lesser starch solids content are separated, said fraction of greater starch content containing about 35 to 50 weight percent of starch solids and at least about 2 times the percent of starch solids in said fraction passed to said centrifugal separation zone.

10. The process of claim 9 in which the separation in said gravity settling zone is accomplished between slanted plates disposed on an angle within said zone and in which the more concentrated starch-containing fraction moves downwardly on said plates and the less concentrated aqueous material moves upwardly between said plates.

11. The process of claim 10 in which said fraction of lesser starch content separated from said liquid cyclone separation zone, is returned to said gravity settling zone and said fraction of greater starch content separated from said liquid cyclone separation zone has at least about 30 weight percent more starch than said fraction passing to said cyclone separation zone.

12. The process of claim 11 is which said gravity settling zone is at a pH of about 3 to 4.

13. The process of claim 12 in which substantially pure, essentially solid starch is recovered from said fraction of greater starch content separated from said liquid cyclone separation zone.

14. The process of claim 1 in which said centrifugal separation zone comprises a liquid cyclone separation zone.

15. The process of claim 14 in which said fraction of greater starch content separated from said liquid cyclone separation zone has at least about 30 weight % more starch than said fraction passing to said cyclone separation zone.

* * * * *